Patented Apr. 8, 1924.

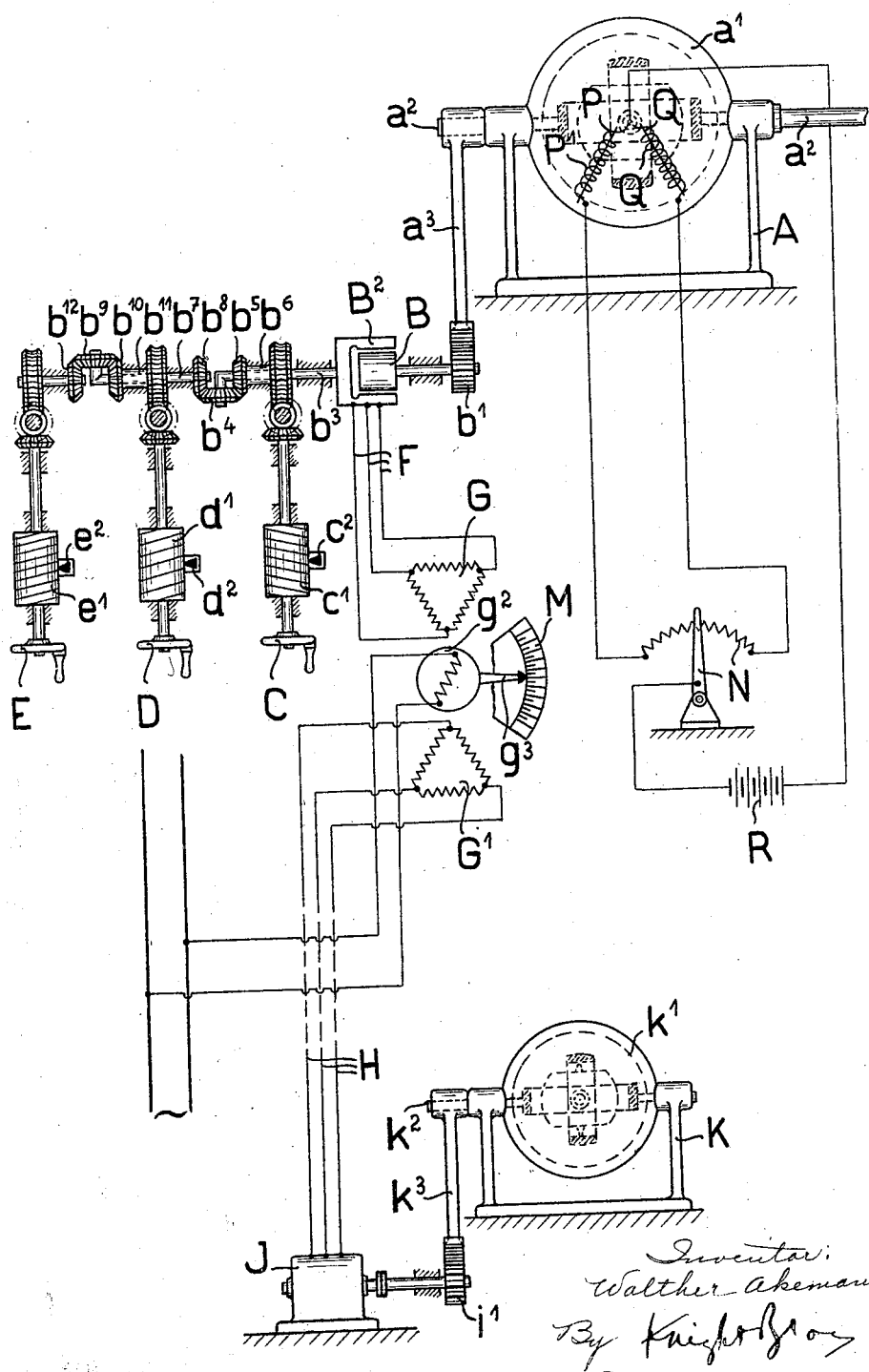

1,489,512

UNITED STATES PATENT OFFICE.

WALTHER AKEMANN, OF ESSEN, GERMANY, ASSIGNOR TO FRIED. KRUPP AKTIEN-GESELLSCHAFT, OF ESSEN-ON-THE-RUHR, GERMANY.

GYROSCOPE APPARATUS.

Application filed January 10, 1922. Serial No. 528,242.

*To all whom it may concern:*

Be it known that I, WALTHER AKEMANN, residing at Essen, Germany, a citizen of the German Republic, have invented a certain new and useful Improvement in Gyroscope Apparatus, of which the following is a specification.

The object of this invention is to provide a gyroscope apparatus adapted to maintain a certain direction relative to the earth's surface and in which besides a main gyroscope apparatus, an auxiliary gyroscope is provided, which is left to itself and, therefore, fixes a direction in space; and in which means are also provided to adjust a Cardan shaft, of the main gyroscope apparatus, determining the direction to be maintained, according to the indications of an indicator mechanism, the indication of which is dependent upon the position the two gyroscope apparatus may happen to assume and upon the position of an adjusting mechanism, which permits of the influence of the earth's rotation and of a change in the location of the gyroscope apparatus on the earth to be taken into account.

An example of the invention adapted for marine purposes, is diagrammatically represented in the drawing.

A is the support of the main gyroscope apparatus, in which support, a gyroscope suspended by means of Cardan suspension, is lodged in a casing $a^1$. On one end of the material axis $a^2$, passing through the casing $a^1$ and to be stabilized by the gyroscope, is keyed a gear sector $a^3$, with which meshes a pinion $b^1$, intended to drive the armature B of an electric long-distance motion transmitter, while the other end of the material axis $a^2$ is adapted to receive transmitter apparatus (not shown), by means of which the movements of the axis $a^2$, relatively to the support A, can be transmitted to the corresponding receivers. The rotatably mounted casing $B^2$ of the transmitter B $B^2$ is fast on a shaft $b^3$, which carries on its rectangularly bent other end the planet wheel $b^4$ of a planetary gear system, one of the stationary wheels $b^5$ of which is mounted on a hollow shaft $b^6$, surrounding the shaft $b^3$, and is positively connected with a hand-wheel C, a self-locking worm drive being interposed. The other stationary wheel $b^8$ is mounted on a shaft $b^7$, which carries on its rectangularly bent end the planet wheel $b^9$ of a second planetary system; one of the stationary wheels $b^{10}$ of this second system is carried by a hollow shaft $b^{11}$, surrounding the shaft $b^7$, and is positively connected with a hand-wheel D, a self-locking worm drive being interposed, while the other stationary wheel $b^{12}$ of the second planetary system $b^9$ $b^{10}$ $b^{12}$ is positively connected with a hand-wheel E, a self-locking worm drive being interposed also. The three hand-wheels C, D and E are rigidly connected with graduated drums $c^1$, $d^1$ and $e^1$, each provided, on its shell surface, with a scale, on which the adjustments of the hand-wheels C, D and E can be read off by means of longitudinally movable markers $c^2$, $d^2$ and $e^2$. The indicator mechanisms constituted by these drums and their markers, are so constructed that they permit of account being taken of the influence of the rotation of the earth and a change in location of the gyroscope on the earth, relatively to the direction to be maintained. The handwheels C, D, E form, in combination with the scale drums and the planetary gear systems, adjusting means for the transmitter casing $B^2$, which enables an adjustment, by means of each of the hand-wheels C, D, and E, independent of the two other handwheels, to be imparted to the transmitter casing $B^2$. The conditions are such that the adjustment of the corresponding receiver, caused by the adjustment of the transmitter armature B and of the casing $B^2$, corresponds to the algebraic sum of the angular movements transmitted to the transmitter B $B^2$ from the material axis $a^2$ and the hand-wheels C, D and E.

The transmitter casing $B^2$ is connected by wires F with the casing coil G of a receiver. The latter has also a second casing coil $G^1$, which is connected by a long distance line H to the stationary casing of a transmitter J, the rotatable part of which is positively connected with the stabilizable material axis $k^2$ of an auxiliary gyroscope device, by a gear sector drive $i^1$ $k^3$. Said device has a support K, provided with a casing $k^1$, enclosing the gyroscope suspended on said support by means of Cardan suspension.

The rotatable part $g^2$ of the receiver is provided with a pointer $g^3$, which can play over a scale M, extending in both directions from a zero point. Now the two casing coils G and $G^1$ of the receiver are so connected with the corresponding transmitter casings that, when the casing $B^2$ is stationary, no movement of the rotatable receiver part $g^2$ takes place, whenever the material axes $a^2$ and $k^2$ of the two gyroscope apparatus are turned in the same direction through equal angles. On the other hand, the rotatable receiver part $g^2$, and with it the pointer $g^3$, must turn in one direction, the transmitter casing $B^2$ being stationary, when the angle of adjustment of the material shaft $a^2$ of the main gyroscope is the greater, and in the other direction when the angle of adjustment of the axis $k^2$ of the auxiliary gyroscope is the greater. If now besides, the casing $B^2$ is turned, by manipulation of the hand-wheels C, D or E, then, as is easily seen, the pointer $g^3$ must again stand opposite the zero point of the scale M, if the adjustment of the casing $B^2$, by the hand-wheels C, D or E, is equal, in opposite direction to the difference of the angles of adjustment of the material axes $a^2$ and $k^2$.

In the immediate vicinity of the indicator mechanism, consisting of the pointer $g^3$ and the scale M, is located a regulating resistance N, the function of which is to influence the strength of the exciting currents of two electro-magnets, the armatures P and Q of which are so secured to the Cardan ring carrying the gyroscope of the main gyroscope apparatus, that, when the two magnets are unequally excited, a turning moment will be exerted on the Cardan ring about its axis, which in turn results in turning the material axis $a^2$. For this purpose, the exciting windings $P^1$ and $Q^1$ of the two magnets are so connected, as shown in the drawing, with the regulating resistance N and a source of current R, that the magnets will be equally excited in the middle position of said resistance, while in any other position, the exciting current in one winding diminishes by the same amount that the current in the other winding increases. Thus the resistance N, with the magnets P $P^1$ and Q $Q^1$, forms a means for varying the angular position of the stabilizable material axis $a^2$.

To understand the operation of the apparatus, let it be assumed that the gyroscope axes of the main and auxiliary gyroscope apparatus are in operation and take a perpendicular position with relation to the earth's surface, while a sighting line, determined by the material axis $a^2$ of the main gyroscope, for example by means of a telescope (not shown), is directed horizontally. Let it also be assumed that all the indicator means are in their zero position and that the resistance N is so adjusted that both electro-magnets P $P^1$ and Q $Q^1$ are equally excited.

It can be assumed with great accuracy that the axis of the auxiliary gyroscope device maintains its position in space, since it does not need to exert any turning moment worth noticing. The main gyroscope also has the tendency to constantly maintain the direction in space of its axis, but it will, after a short time, not be able, in view of the turning moment it has to exert, to maintain the original direction of its axis relatively to space. As long as the axes of the main and auxiliary gyroscope devices are parallel to each other and, therefore, no force is exerted upon the pointer $g^3$ of the receiver G $G^1$ $g^2$, seeking to turn it out of its original angular position, said pointer maintains its original position at the zero mark of the scale M. But as soon as the axis of the main gyroscope takes a position in space, under the influence of the turning moment exerted, near its original direction and the sighting line of the telescope correspondingly varies its direction relatively to space, the transmitter armature B receives an angular displacement through the gears $a^3$ $b^1$, which results in a corresponding movement of the corresponding receiver armature $g^2$ and therewith of the pointer $g^3$. In accordance with the displacement of the pointer $g^3$, the resistance N is now adjusted in one or the other direction so that the magnets P $P^1$ and Q $Q^1$, now unequally excited, exert a turning moment on the Cardan ring carrying the gyroscope, which moment in turn returns the gyroscope axis into its original position in space. In this way, the deviations in direction of the main gyroscope axis, and therewith of the sighting line determined by the axis $a^2$, are first counteracted, they being due to the fact that the main gyroscope device has to impart turning moments involving work, while the auxiliary gyroscope device runs practically frictionless. In order to still ensure that the pivotal axis of the main gyroscope device constantly maintains its perpendicular direction relative to the earth's surface, it is necessary to overcome the influence of the earth's rotation as well as of a change of location of the apparatus on the earth. For this purpose, the transmitter casing $B^2$ is given an adjustment by the hand-wheels C, D and E, which is combined algebraically in accordance with the angular movements of said wheels and takes account of the influence of the earth's rotation (geographical latitude) as well as of change in location of the apparatus (course direction and speed of the ship carrying the apparatus). The adjustment of the casing $B^2$ has the result that the pointer $g^3$ of the corresponding receiver is angularly moved the same amount. The resistance N is therefore adjusted, in accordance with the deviation of the pointer $g^3$, in one or the other direction, so that the now unequally excited electro-magnets exert a turning moment on the Cardan ring which, in turn causes a displacement angularly of the gyroscope axis and therewith of the material axis $a^2$, which displacement is taken part in, through the gears $a^3$, $b^1$, by the armature B and the pointer $g^3$ of the corresponding receiver, the pointer $g^3$ turning in the opposite direction to the last mentioned movement of said pointer. As soon as the pointer $g^3$ has reached its middle zero position again, the resistance N is again so adjusted that the two electromagnets are equally excited and therefore exert no further turning moment on the Cardan axis of the main gyroscope. The gyroscope axis and therewith the sighting line determined by the material axis $a^2$, therefore, come quickly to rest in their new position. The conditions are so chosen that the gyroscope axis of the main device again stands, in its new position, perpendicular to the earth's surface and, therefore, the direction determined by the axis $a^2$ is again horizontal.

As soon, in the further rotation of the gyroscope, the pointer $g^3$ is deviated, the gyroscope axis of the main device is adjusted by correspondingly adjusting the resistance N until the pointer $g^3$ again stands at zero. The same thing takes place each time the pointer has been given an additional adjustment by turning one of the handwheels C, D or E.

Claims.

1. An apparatus for maintaining a fixed direction on the earth's surface comprising a main gyroscope, a Cardan suspension therefor, an independent auxiliary gyroscope adapted to maintain a direction in space, an indicating apparatus, means connecting said gyroscopes to said indicating apparatus, means for adjusting a Cardan ring of the Cardan suspension of the first mentioned gyroscope and an adjusting mechanism for correcting the reading of said indicator to off-set the influence of the earth's rotation and a change in location of the apparatus on the earth.

2. An apparatus for maintaining a fixed direction on the earth's surface comprising a main gyroscope establishing the direction to be fixed, a Cardan suspension for said gyroscope, means for adjusting a Cardan ring of said Cardan suspension, an independent auxiliary gyroscope, a transmitter operatively connected to each gyroscope, an indicator embodying an adjustable part, a receiver for controlling the adjustable part of said indicator, electrical long distance means for connecting said transmitters to said receiver whereby said indicator will show the difference of the angles of rotation of the transmitters and an adjusting mechanism for additionally adjusting the movable part of said indicator to offset the influence of the earth's rotation and the change in location of the apparatus upon the direction to be maintained.

3. An apparatus for maintaining a fixed direction on the earth's surface comprising a main gyroscope establishing the direction to be fixed, a Cardan suspension therefor, means for adjusting a Cardan ring of said Cardan suspension, an independent auxiliary gyroscope, an indicator provided with a movable part, a receiver for controlling the movable part of said indicator, a transmitter operatively connected to each gyroscope, electric long distance means for connecting said transmitters to said receiver whereby the difference of the angles of rotation of said transmitters will be transmitted to said indicator and means connected to the rotary part of one of said transmitters and comprising a plurality of independently adjustable elements, for imparting through said transmitter to the movable part of said indicator an additional adjustment for counteracting the influence of the earth's rotation and the changes in location of the apparatus on the earth.

4. An apparatus of the class described for maintaining a fixed direction on the earth's surface comprising a main gyroscope, a Cardan suspension therefor, a shaft stabilized by said gyroscope and determining the direction to be maintained, an auxiliary gyroscope, an indicator embodying a movable part, a receiver for controlling the movable part of said indicator an electrical long distance control connecting said gyroscopes to said receiver and embodying transmitters, means for adjusting the movable part of one of said transmitters for correcting the position of the movable part of said indicator, and means for adjusting said stabilized shaft comprising a pair of electromagnets, a resistance in circuit with said electromagnets, a source of current, and means for controlling the resistance in circuit with said electromagnets, said electromagnets upon excitation exerting a turning moment on a Cardan ring of said Cardan suspension and consequently rotating said stabilized shaft.

The foregoing specification signed at Essen, Germany, this 8th day of December, 1921.

WALTHER AKEMANN.